US006997582B2

(12) United States Patent
Yang et al.

(10) Patent No.: US 6,997,582 B2

(45) Date of Patent: Feb. 14, 2006

(54) DIRECT TYPE BACK LIGHT DEVICE AND FRAME THEREOF

(75) Inventors: Pang-Lun Yang, Wuci Township, Taichung County (TW); Ting-Hui Chih, Hualien (TW)

(73) Assignee: Benq Corporation, Taoyuan (TW)

( * ) Notice: Subject to any disclaimer, the term of this patent is extended or adjusted under 35 U.S.C. 154(b) by 212 days.

(21) Appl. No.: 10/638,726

(22) Filed: Aug. 11, 2003

(65) Prior Publication Data

US 2004/0057227 A1 Mar. 25, 2004

(30) Foreign Application Priority Data

Sep. 25, 2002 (TW) ............................... 91122079 A

(51) Int. Cl.
*B60Q 1/06* (2006.01)
*F21V 29/00* (2006.01)

(52) U.S. Cl. .......................... 362/373; 362/30; 349/58; 349/70

(58) Field of Classification Search ............ 362/29–30, 362/373, 561; 349/58–70

See application file for complete search history.

(56) References Cited

U.S. PATENT DOCUMENTS

| | | | | |
|---|---|---|---|---|
| 5,623,392 | A * | 4/1997 | Ma | 361/681 |
| 5,726,722 | A * | 3/1998 | Uehara et al. | 349/66 |
| 6,089,739 | A * | 7/2000 | Yamamoto et al. | 362/561 |
| 6,494,429 | B1 * | 12/2002 | Tajima | 248/473 |
| 6,580,477 | B1 * | 6/2003 | Cho | 349/65 |
| 6,642,974 | B1 * | 11/2003 | Liao | 349/64 |

* cited by examiner

*Primary Examiner*—Stephen Husar
*Assistant Examiner*—Jason Han
(74) *Attorney, Agent, or Firm*—Snell & Wilmer L.L.P.

(57) ABSTRACT

A frame for a direct type back light device is provided. The frame includes a base and a plurality of side-plates. The base has a groove and an opening. The groove has a first end and a corresponding second end. The side-plates are respectively disposed on a periphery of the base so that a first slit and a second slit are formed at positions corresponding to the first and the second ends. The first and second slits have different sizes.

16 Claims, 3 Drawing Sheets

DIRECT TYPE BACK LIGHT DEVICE AND FRAME THEREOF

CROSS REFERENCE TO RELATED APPLICATIONS

This application claims priority to Taiwan Patent Application No. 091122079 entitled "Direct Type Back Light Device and Support Frame Thereof", filed Sep. 25, 2002.

1. Field of Invention

The present invention generally relates to a direct type back light device and a frame thereof and, more particularly, to a direct type back light device with a frame having heat dissipation design.

2. Background of the Invention

Liquid crystal display (LCD) devices characterized by compact size and excellent image qualities have gradually taken the place of conventional cathode ray tube (CRT) devices because it has been difficult to miniaturize the volume and the weight of CRT devices. The LCD device itself does not emit light, and thus a light source is required. The light source, which irradiates the LCD device, generally refers to a back light device.

The back light devices are generally classified into two types: an edge type and a direct type. The edge type back light device includes a lamp typically arranged on an edge side of the LCD device, a light guide plate positioned next to the lamp, a diffusion sheet disposed above the light guide plate, and a reflection plate disposed below the light guide plate. The light guide plate can uniformly distribute rays irradiated from the lamp to the LCD panel. The reflection plate reflects rays back to the diffusion plate so that most of the rays from the lamp can incident to the diffusion plate.

Comparatively, the direct type back light device does not require a light guide plate. Linear light is directed to the LCD display from a light source via a diffusion plate. Therefore, the direct type back light device is widely used in large sized LCD devices because it has high light transmission and does not have a limitation in the size of the display area.

Conventional direct type back light devices lack designs for dissipating heat. Therefore the heat generated by the lamp easily overheats the back light device, reduces its performance, and more particularly, damages the back light device. Therefore, there is a need to provide a frame for a back light device to improve the heat dissipation ability.

SUMMARY OF THE INVENTION

It is one aspect of the present invention to provide a frame having heat dissipation ability for a direct type back light device. The frame includes a base and a plurality of side-plates. The base has a groove and an opening, and the groove has a first end and a corresponding second end. The side-plates are respectively disposed on a periphery of the base so that a first slit and a second slit are formed at positions corresponding to the first end and the second end of the groove. The first and second slits have different sizes.

In an embodiment, the groove is a trapezoid groove, and the first and second slits are in different sizes allowing air to flow through. Furthermore, the base has a first edge, a second edge, and a third edge, and the side-plates include two first side-plates and a second side-plate. The first side-plates are respectively disposed on the first and the third edges, and the second side-plate is disposed on the second edge. Each first side-plate has a vent for dissipating heat, and the second side-plate has a hole for allowing a cable to pass through.

It is another aspect of the present invention to provide a direct type back light device. The direct type back light device includes the frame described above, a lamp set, and a diffusion plate. The base further includes at least one retainer and at least one supporter. The retainer connects to the lamp set. The retainer is disposed on the base so as to allow the lamp set to be disposed in the frame and a predetermined distance is formed between the lamp set and the second side-plate. The supporter supports the diffusion plate so as to allow the diffusion plate to be disposed above the lamp set.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

Figure 1A:
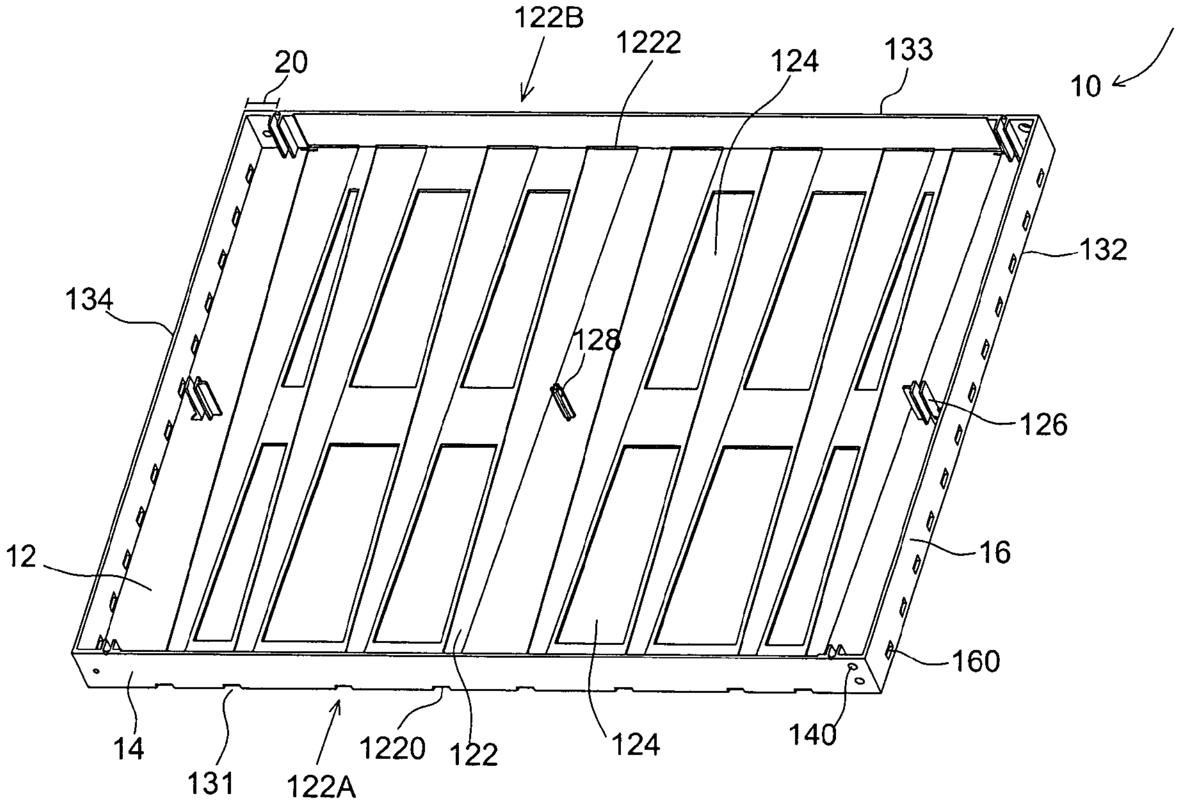
FIG. 1A illustrates a three-dimensional view of an exemplary frame of the present invention.

Referring to FIGS. 1A to 1D, in one embodiment of the present invention, a frame 10 for a direct type back light device is provided. The frame 10 includes a base 12 and a plurality of side-plates. The base 12 has a groove 122 and an opening 124 for dissipating heat. The groove 122 has a first end 122A and a corresponding second end 122B. In this embodiment, the side-plates include two first side-plates 14 and two second side-plates 16 respectively disposed on a periphery of the base 12, so that a first slit 1220 and a second slit 1222 are formed at positions corresponding to the first end 122A and the second end 122B of the groove 122.

The groove 122 can be a trapezoid groove or a triangle groove. When the groove 122 is a trapezoid groove, the first and second ends 122A and 122B are parallel.

The base 12 has a first edge 131, a second edge 132, a third edge 133, and a fourth edge 134. The two first side-plates 14 are respectively disposed on the first and the third edges 131 and 133 so that the first slit 1220 and the second slit 1222 with different sizes are formed corresponding to the first and the second ends 122A and 122B, as shown in FIGS. 1C and 1D. In this embodiment, the first slit 1220 (as an inlet) is a smaller slit and the second slit 1222 is a larger slit so as to allow air to flow into the frame 10. The air carrying heat generated by the back light device flows out of the frame 10 through the slit 1222 (as an outlet).

Figure 1D:
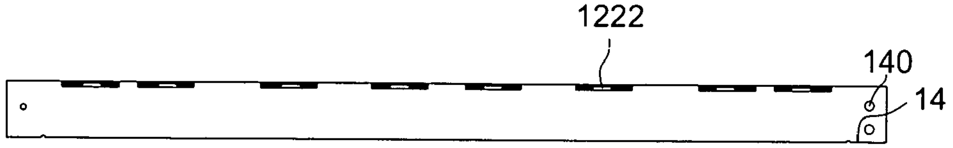
FIG. 1D illustrates a side view from the second end of the groove of FIG. 1A.
Figure 1B:
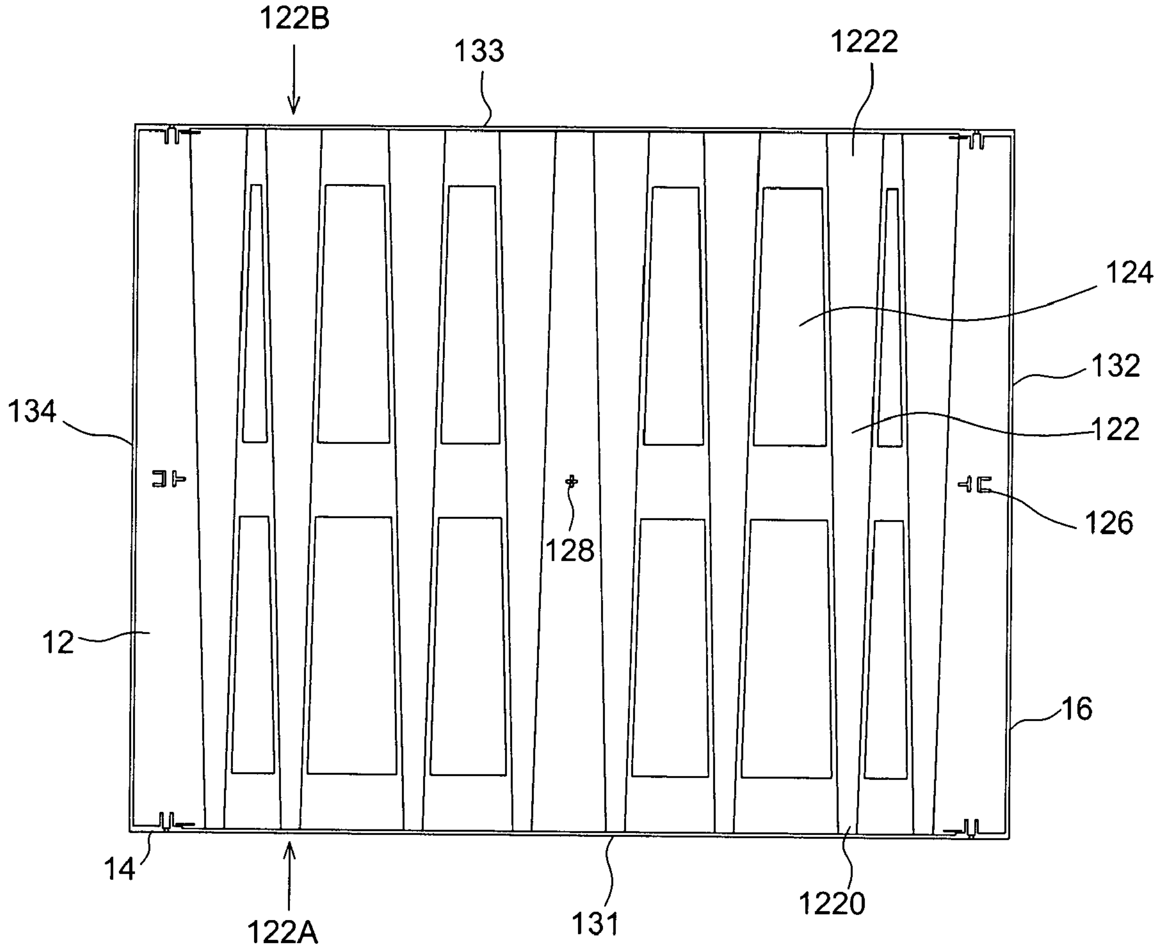
FIG. 1B illustrates a top view of FIG. 1A.
Figure 1C:
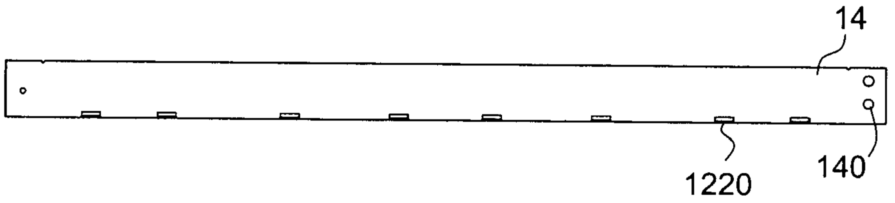
FIG. 1C illustrates a side view from the first end of the groove of FIG. 1A.

As shown in FIG. 1A, in this embodiment, the base 12 is in a rectangular shape, and has eight trapezoid groove 122 and twelve trapezoid opening 124. The openings 124 are arranged in pairs and disposed between every two adjacent grooves 122. The first side-plates 14 are respectively disposed on the first and the third edges 131 and 133 so as to form eight inlets (slits 1220) and eight outlets (slits 1222) on the first and second ends 122A and 122B. The first side-plate 14 has at least one vent 140 for dissipating heat. The vents 140 can be disposed at ends of the first side-plate 14. The second side-plates 16 are respectively disposed on the second edge 132 and the fourth edge 134. Each second side-plate 16 has at least one hole 160 for allowing a cable to pass through. For example, a cable (not shown) connected to a lamp set can pass through the holes 160 on the frame 10. Furthermore, the hole 160 can also serve as a vent for allowing air to flow through.

Figure 2:
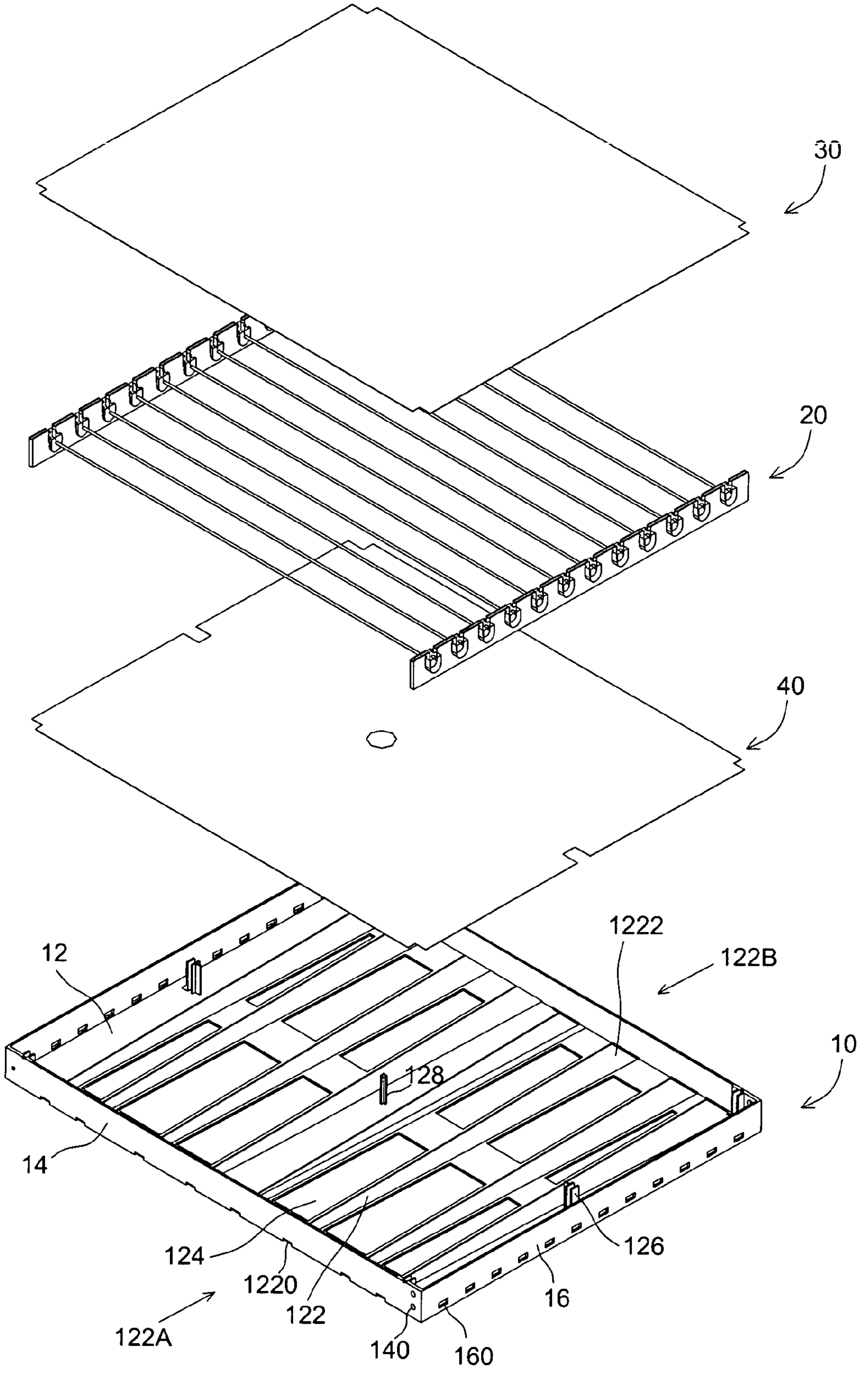
FIG. 2 illustrates an explosive view of an exemplary direct type back light device of the present invention.

Referring to FIG. 2, in another embodiment, a direct type back light device 100 is provided. The direct type back light device 100 includes the frame 10 described above, a lamp set 20 disposed in the frame 10, and a diffusion plate 30 disposed above the lamp set 20. The frame further includes at least one retainer 126 for connecting the lamp set 20. The retainer 126 is disposed on the base 12 so that a predetermined distance is formed between the lamp set 20 and the second side-plate 16. In such an arrangement, the heat generated at two ends of the lamp set 20 can be dissipated through the vents 140 of the first side-plates 14. The base 12 further includes a supporter 128 for supporting the diffusion plate 30, so that lights emitted from the lamp set 20 can be uniformly diffused.

Furthermore, the frame 10 further includes a cover plate positioned above the groove 122 and the opening 124 to improve heat dissipation by convection. The cover plate 40 can be made of metal, such as aluminum.

It is noted that the scope of the invention is not limited to those described in the embodiments even though the numbers and shapes of the groove 122, the opening 124, the first and second slits 1220 and 1222 (inlet/outlet), the retainer 126, the supporter 128, and the hole 160 are illustrated specifically. Furthermore, the backlight device 100 can further includes other components that are not described in the embodiments, such as a reflection sheet disposed under the lamp set 20 in the frame 10.

Although specific embodiments have been illustrated and described, it will be obvious to those skilled in the art that various modifications may be made without departing from what is intended to be limited solely by the appended claims.

We claim:

1. A frame used in a direct type back light device, said frame comprising:

a base having a groove formed therein and an opening formed adjacent to said groove, said groove having a first end and a second end opposite to said first end; and a plurality of side-plates respectively disposed on a periphery of said base, so that a first slit and a second slit being formed at positions correspond to said first end and said second end of said groove, and said first slit and said second slit having different sizes and allow air to flow through along said groove; wherein said groove comprises a trapezoid groove, and said first end of said groove is parallel to said second end of said groove.

2. The frame of claim 1, wherein said base has a first edge, a second edge, a third edge, and a fourth edge, said side-plates comprise two first side-plates and a second side-plate, said first side-plates are disposed at said first and said third edges, and said second side-plate is disposed at said second edge.

3. The frame of claim 2, wherein each first side-plate has a vent for dissipating heat.

4. The frame of claim 2, wherein said second side-plate has a hole for allowing a cable to pass through.

5. The frame of claim 2, further comprising at least one retainer for connecting a lamp set.

6. The frame of claim 5, wherein said retainer is disposed on said base so that a predetermined distance is formed between said lamp set and said second side-plate.

7. The frame of claim 1, wherein the base further comprises a supporter for supporting a diffusion plate.

8. The frame of claim 1, further comprising a cover plate for covering said groove and said opening.

9. A direct type back light device, comprising:

a frame having a base and a plurality of side-plates;

a lamp set disposed in said frame; and a diffusion plate disposed above said lamp set;

wherein said base has a groove formed therein and an opening formed adjacent to said groove, said groove has a first end and a second end opposite to said first end, said side-plates are disposed on a periphery of said base, so that a first slit and a second slit are formed corresponding to said first end and said second end of said groove, and said first slit and said second slit have different sizes and allow air to flow through along said groove; wherein said groove comprises a trapezoid groove, and said first end of said groove is parallel to said second end of said groove.

10. The direct type back light device of claim 9, wherein said base has a first edge, a second edge, and a third edge, said side-plates comprise two first side-plates and a second side-plate, said first side-plates are respectively disposed on said first edge and said third edge, and said second side-plate is disposed on said second edge.

11. The direct type back light device of claim 10, wherein each first side-plate has a vent for dissipating heat.

12. The direct type back light device of claim 10, wherein said second side-plate has a hole for allowing a cable to pass through.

13. The direct type back light device of claim 10, further comprising at least one retainer for connecting said lamp set.

14. The direct type back light device of claim 13, wherein said retainer is disposed on said base so that a predetermined distance is formed between said lamp set and said second side-plate.

15. The direct type back light device of claim 9, wherein the base further comprises a supporter for supporting said diffusion plate.

16. The direct type back light device of claim 9, further comprising a cover plate for covering said groove and said opening.

* * * * *